(12) United States Patent
Van Wijk et al.

(10) Patent No.: US 12,353,867 B2
(45) Date of Patent: Jul. 8, 2025

(54) SOFTWARE UPDATE PROCESS ON A VEHICLE

(71) Applicant: JAGUAR LAND ROVER LIMITED, Coventry (GB)

(72) Inventors: Gido Van Wijk, Coventry (GB); Aengus Gorey, Coventry (GB); Gordon Reineke, Coventry (GB); Cian Dowling, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 21 days.

(21) Appl. No.: 17/905,757

(22) PCT Filed: Mar. 5, 2021

(86) PCT No.: PCT/EP2021/055587
§ 371 (c)(1),
(2) Date: Sep. 6, 2022

(87) PCT Pub. No.: WO2021/176054
PCT Pub. Date: Sep. 10, 2021

(65) Prior Publication Data
US 2024/0201971 A1 Jun. 20, 2024

(30) Foreign Application Priority Data
Mar. 5, 2020 (GB) .................................... 2003199

(51) Int. Cl.
*G06F 8/65* (2018.01)
*G06F 3/06* (2006.01)

(52) U.S. Cl.
CPC .............. *G06F 8/65* (2013.01); *G06F 3/0604* (2013.01); *G06F 3/0644* (2013.01); *G06F 3/0671* (2013.01)

(58) Field of Classification Search
None
See application file for complete search history.

(56) References Cited

U.S. PATENT DOCUMENTS

2012/0041638 A1* 2/2012 Johnson .............. G06F 11/3003
701/33.1
2016/0321063 A1* 11/2016 Yang ................... G06F 11/1433
(Continued)

OTHER PUBLICATIONS

Great Britain Intellectual Property Office, Combined Search and Examination Report under Sections 17 and 18(3) Issued in Application No. GB2003199.3, Aug. 20, 2020, 5 pages.
(Continued)

*Primary Examiner* — Lewis A Bullock, Jr.
*Assistant Examiner* — Mark A Gooray
(74) *Attorney, Agent, or Firm* — McCoy Russell LLP

(57) ABSTRACT

A control system for a vehicle comprises one or more controllers configured to access at least one partitioned memory. The control system is configured to: receive a software update package, the software update package comprising partition validation data and partition distribution data; determine a current partition distribution data of the memory; compare the current partition distribution data with the partition validation data; and repartition the memory in dependence on the received partition distribution data if the current partition distribution data matches the partition validation data.

20 Claims, 7 Drawing Sheets

(56) References Cited

U.S. PATENT DOCUMENTS

2017/0147226 A1    5/2017  Oung et al.
2017/0155514 A1*   6/2017  Schulz .................... G06F 21/57
2020/0050378 A1    2/2020  Sakurai et al.

OTHER PUBLICATIONS

ISA European Patent Office, International Search Report and Written Opinion Issued in Application No. PCT/EP2021/055587, Jun. 14, 2021, WIPO, 12 pages.

* cited by examiner

SOFTWARE UPDATE PROCESS ON A VEHICLE

CROSS REFERENCE TO RELATED APPLICATIONS

The present application is a U.S. National Phase of International Application No. PCT/EP2021/055587 entitled "SOFTWARE UPDATE PROCESS ON A VEHICLE," and filed on Mar. 5, 2021. International Application No. PCT/EP2021/055587 claims priority to Great Britain Patent Application No. 2003199.3 filed on Mar. 5, 2020. The entire contents of each of the above-listed applications are hereby incorporated by reference for all purposes.

TECHNICAL FIELD

The present disclosure relates to a software update process on a vehicle. Aspects of the invention relate to a control system for a vehicle, to a vehicle, and to a method of repartitioning a controller for a vehicle.

BACKGROUND AND SUMMARY

Modern vehicles are becoming increasingly connected and have ever increasing amounts of computational power within their on-board vehicle control systems. For example, the main vehicle controller may have 25 GB or more of memory that is used by the main system software. The memory of the main vehicle controller is typically partitioned to include, for example, read-only system partitions as well as read/write user data partitions. Furthermore, the memory may include unallocated disk space or an un-used partition to allow for the disk to be updated or reconfigured as required.

It is known to re-partition memories by re-flashing partition tables directly to the disk. However, re-partitioning a memory can lead to corrupted data if the re-partitioning process is not performed correctly. Furthermore, to re-partition a vehicle controller or electronic control unit, ECU, a hardware debug interface is required for the ECU which allows the new partition tables to be re-flashed directly to the ECU.

However, once an ECU has been installed within a vehicle, physical access to the memory becomes difficult. Additionally, user read/write data partitions that are used to store user data should not be overwritten or lost as a result of re-partitioning. As such, there is a requirement to provide a means of re-partitioning the memory of a vehicle controller without overwriting or corrupting user data or system data that is already stored on the disk.

It is known to transmit software updates to vehicles wirelessly using software-over-the-air (SOTA) technologies that utilise the mobile or Wi-Fi® networks to transmit software update packages to vehicles. This is beneficial as it allows the software to be updated on the vehicle without the need to take the vehicle to a garage. However, software update packages supplied during a software update may become corrupt during transmission. Furthermore, software on vehicles may be modified by third parties (e.g. a vehicle owner may make software modifications outside of the OEM's normal update process). As such, there is a requirement to validate the compatibility of a software update prior to installing it, particularly where the memory is to be re-partitioned, in order to prevent data stored in the vehicle memory becoming corrupt or being overwritten when the software update is installed.

It is an aim of the present invention to address one or more of the disadvantages associated with the prior art.

Aspects and embodiments of the invention provide a control system for a vehicle, a vehicle, and a method of re-partitioning a partitioned memory on a vehicle.

According to an aspect of the present invention there is provided a control system for a vehicle, the control system comprising one or more controllers configured to access at least one partitioned memory, the control system configured to: receive a software update package, the software update package comprising partition validation data and partition distribution data; determine a current partition distribution data of the memory; compare the current partition distribution data with the partition validation data; and repartition the memory in dependence on the received partition distribution data if the current partition distribution data matches the partition validation data.

Re-partitioning the memory when the current partition distribution data matches the partition validation data beneficially prevents the memory being re-partitioned incorrectly and corrupted. The control system is configured to determine the current partition distribution data of the memory and compare it with received partition validation data. The received partition validation data may be, for example, an allowable partition distribution or a whitelist of allowable partition distributions. Comparing the current partition distribution with an allowable partition distribution ensures that the software update package was not corrupted during transmission and that the memory is partitioned as expected and has not been modified.

The received partition distribution data is data indicative of the position of partitions within the memory. The received partition distribution data may be a new partition distribution such as a new partition table, partition binary file or partition hash indicative of a partition distribution. The memory is repartitioned according to the received partition data if the current partition distribution matches the received partition validation data.

In one embodiment the one or more controllers may collectively comprise:
 at least one electronic processor having an electrical input for receiving the software update data; and at least one memory device electrically coupled to the at least one electronic processor and having instructions stored therein; and wherein the at least one electronic processor is configured to access the at least one memory device and execute the instructions thereon so as to repartition the partitioned memory if the current partition distribution data matches the partition validation data.

In another embodiment the partition distribution data may comprise a memory partition update and wherein the memory is repartitioned according to the memory partition update. The memory partition update may be a new partition table, a new partition hash or a new partition binary file that may be used to re-partition the memory.

In one embodiment the partition validation data is representative of at least a part of a partition structure of the memory partition update. The partition validation data may be a list of allowable partition distributions. For example, the partition validation data may be a list of allowable partition distribution tables, partition binaries or partition hashes. The partition validation data beneficially allows the control system to validate the partition distribution data received in the software update package prior to re-partitioning the memory so as to confirm that it is safe to re-partition the memory as part of the software update procedure. The received partition distribution data may be considered to be safe if it matches an allowable partition distribution contained within the partition validation data.

In another embodiment determining the current partition distribution may comprise generating a partition distribution value, optionally a partition hash value, representative of at least a part of a partition distribution structure of the partitioned memory. The partition distribution value generated may be compared with the partition validation data received in the software update package. The partition distribution value may be a partition hash, a partition binary file or a partition distribution. The partition distribution value may be in a form suitable to be compared with the received partition validation data.

In an embodiment the partition distribution value may be representative of a core or used partition distribution structure. The core partition distribution structure is the area of the memory that is already in use (as opposed to an unallocated or un-partitioned area of the disk space) and as such should not be overwritten or re-partitioned as doing so may corrupt the memory.

In one embodiment the control system may be configured to inhibit a software update associated with the software update package if the partition distribution data does not match the partition validation data. This is beneficial as inhibiting the software update such that the memory is not re-partitioned prevents the memory being re-partitioned in such a way that may overwrite or corrupt data stored on the memory.

In another embodiment the controller is configured to abort or inhibit repartitioning the memory if the received partition distribution data matches the current partition distribution. This is beneficial as if it is determined that the received partition distribution data matches the current partition distribution then it may be inferred that the controller has already received the software update package (e.g. via an alternative route to a SOTA update) and as such there is no need to repartition the memory.

In an embodiment the partition validation data may comprise a whitelist of allowable partition distributions. The allowable partition distributions may be representative of old partition distributions of the memory. For example, the allowable partition distributions may be representative of previous partition distributions based on previous versions of the software. This is beneficial as it allows the controller to determine if the memory has been re-partitioned or modified by a third party such that the memory is re-partitioned in an unsupported manner. The allowable partition distributions may comprise an allowable partition hash of the allowable partition distributions.

In one embodiment the memory may comprise an unused partition area and wherein repartitioning the memory comprises repartitioning at least a portion of the unused partition area. This is beneficial as re-partitioning the memory does not alter the partition structure of the used area thereby ensuring that data stored within the used partition is not overwritten or corrupt as a result of re-partitioning the memory.

In another embodiment the software update package may comprise the current partition distribution. In an embodiment the control system may be configured to compare the current partition distribution received in the software update package with the current partition distribution determined by control system. The processor may be configured to inhibit or abort a software update associated with the software update package if the compared current partition distributions do not match. This is beneficial as if the partition distributions do not match this may indicate that the software update package was corrupt or damaged during transmission. Alternatively it may indicated that the control system has been modified and is running an unsupported memory partition distribution.

In another embodiment at least one of: the current partition distribution, the partition validation data and the partition distribution data may be a partition hash. In one embodiment the received partition distribution data may comprise a new partition table or a new partition binary.

According to another aspect of the present invention, there is provided a vehicle comprising a controller in accordance with any one of the aforementioned aspects and embodiments.

According to yet another aspect of the present invention there is provided a method of repartitioning a controller for a vehicle, the controller comprising at least one partitioned memory, the method comprising: receiving a software update package, the software update package comprising partition validation data and partition distribution data; determining a current partition distribution data of the memory; comparing the current partition distribution data with the partition validation data; and repartitioning the memory in dependence on the received partition distribution data if the current partition distribution data matches the partition validation data.

In one embodiment the method may comprise inhibiting or aborting a software update associated with the software update package if the partition distribution data does not match the partition validation data.

In another embodiment the method may comprise inhibiting or aborting the software update if the received partition distribution matches the current partition distribution. This is beneficial as it prevents the memory being re-partitioned with an identical partition distribution.

In an embodiment the partition validation data may comprise a whitelist of allowable partition distributions. The allowable partition distributions may be representative of old or previous partition distributions of the memory. The one or more old partition distributions may comprise old partition hashes and the method may comprise determining a partition hash of the current partition distribution and comparing the partition hash of the current partition distribution with the old partition hashes.

In one embodiment the memory may comprise an unused partition area and repartitioning the memory may comprise repartitioning at least a portion of the unused partition area.

In another embodiment the software update may comprise the current partition distribution. The method may comprise comparing the current partition distribution received in the software update with the determined current partition distribution and aborting the software update if they do not match.

In an embodiment the software update may comprise a new partition table or a new partition binary. The method may comprise repartitioning the memory in dependence on the new partition table or the new partition binary.

According to a yet further aspect of the present invention there is provided a non-transitory computer readable medium comprising computer readable instructions that, when executed by a processor, cause performance of the method of any one of the aforementioned aspects and embodiments.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE FIGURES

One or more embodiments of the invention will now be described, by way of example only, with reference to the accompanying drawings, in which.

DETAILED DESCRIPTION

In general terms embodiments of the invention relate to a method of updating the software on a vehicle wherein the software update requires the memory or disk to be repartitioned. The vehicle comprises a vehicle control system, having a partitioned memory, configured to receive a software update package from a remote server. The software update package comprises partition validation data and partition distribution data, for example a new partition table, partition binary or partition hash. Upon receipt of the software update package the control system determines the partition distribution data of the memory and compares the determined partition distribution data with the partition validation data, for example a whitelist of allowable partition distributions. If the determined current partition distribution data matches the partition validation data the vehicle control system is configured to repartition the memory with the partition distribution data.

The invention prevents the memory being re-partitioned with a partition distribution associated with a received software update package that may corrupt the memory. For example, if the software update package is corrupted during transmission from the remote server to the vehicle then repartitioning the memory may corrupt the memory. Alternatively, if the vehicle control system has been modified by a third party or the vehicle owner then the memory may have been partitioned such that what should be unused disk space is already in use and thus re-partitioning the memory with a new partition distribution may corrupt the memory. Comparing the current partition distribution data with partition validation data or an allowable partition distribution, such as a whitelist of allowable partition distributions, confirms that repartitioning the memory with the new partition data will not corrupt the disk thereby improving the reliability of the update process.

Figure 1:
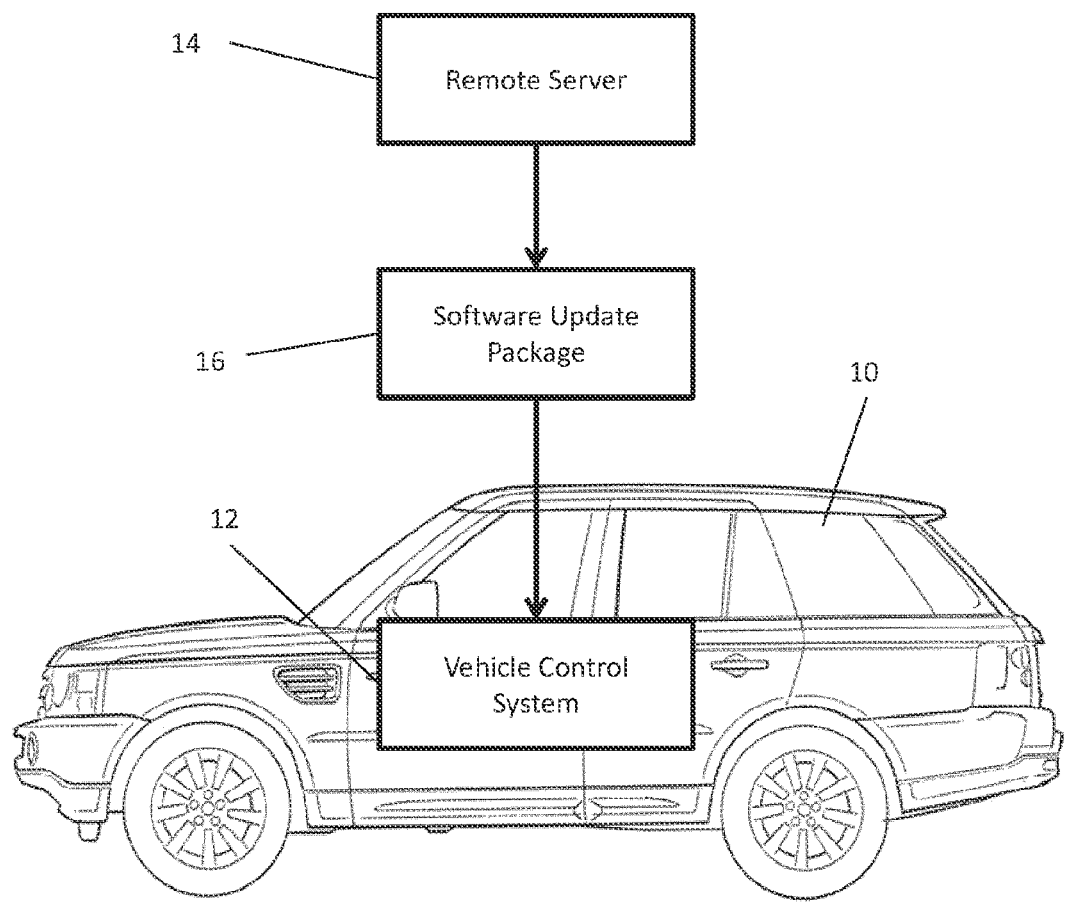
FIG. 1 shows a vehicle comprising a vehicle control system receiving a software update package from a remote server according to an embodiment of the invention.

To place embodiments of the invention in a suitable context reference will firstly be made to FIG. 1 which shows a vehicle 10 comprising a vehicle control system 12 configured to communicate wirelessly with a remote server 14. The vehicle control system 12 may comprise one or more ECUs to control systems on the vehicle 10. The vehicle control system 12 is wirelessly connected with the remote server 14 such that data may be shared between the vehicle 10 and the remote server 14. This is beneficial as the remote server 14 may communicate with the vehicle 10 to perform operations such as software updates on the vehicle 10. For example, the remote server 14 may transmit a software update package 16 to the vehicle 10 as shown in FIG. 1.

The remote server 14 is configured to transmit a software update package 16 from the remote server 14 to the vehicle control system 12 so as to update the software on the vehicle control system 12. The software update package 16 may be transmitted to the vehicle 10 using software-over-the-air (SOTA) technology. For example, the software update package 16 may be transmitted to the vehicle 10 across a Wi-Fi® network or a mobile network. Transmitting the software update package 16 using SOTA beneficially allows the software on the vehicle control system 12 to be updated periodically without the requirement for the vehicle 10 to be taken to a garage to be serviced.

Figure 2:
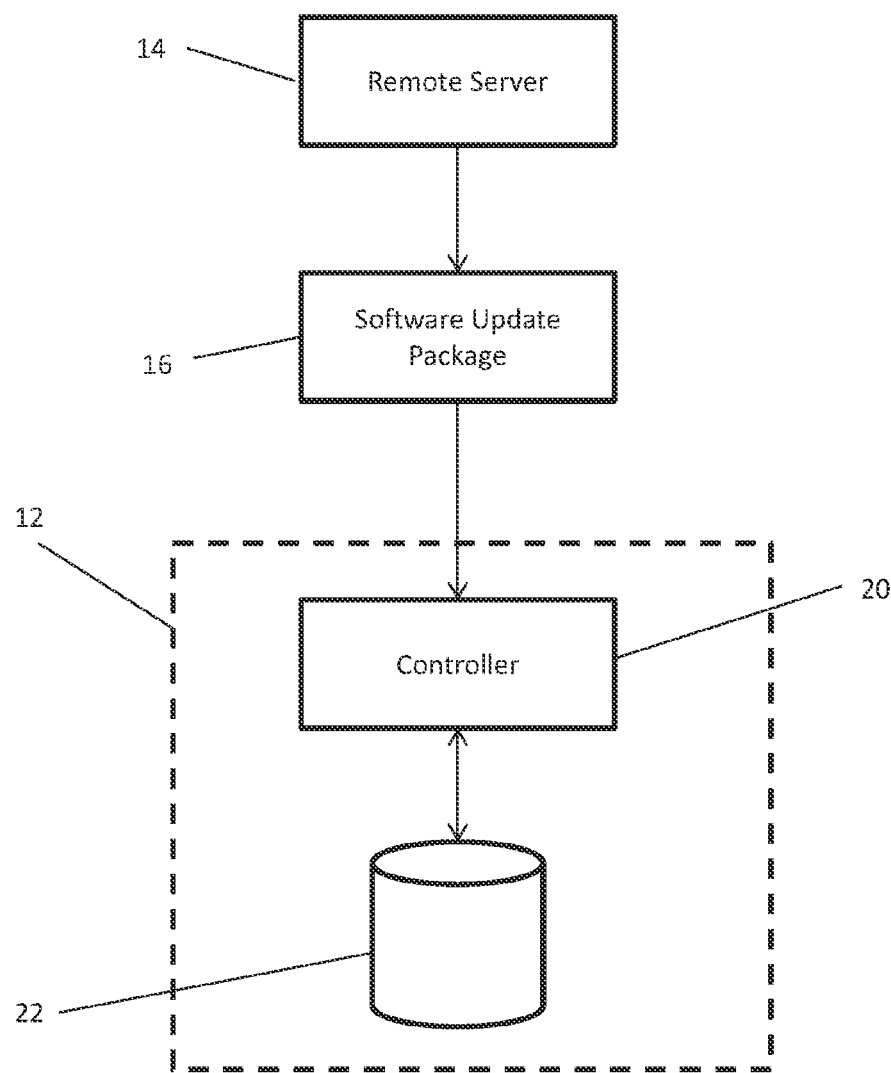
FIG. 2 shows a schematic diagram of the vehicle control system receiving a software update package from the remote server.

Turning now to FIG. 2, the vehicle control system 12 is shown schematically in further detail. As shown in FIG. 2 the vehicle control system 12 comprises a controller 20 electronically coupled to a memory 22 such that the controller 20 may read and write data to, and from, the memory 22. The controller 20 is configured to receive the software update package 16 from the remote server 14 and determine, based on the received software update package 16 and the software running on the vehicle control system 12, if the software update contained within the update package 16 should be applied to the vehicle control system 12. If the controller 20 determines that the software update package 16 should be installed the memory 22 may be re-partitioned and the data or software on the memory 22 is updated based on the update within the software update package 16.

The memory 22 of the vehicle control system 12 comprises one or more memory partitions which are allocated based on the memory and system requirements of the vehicle control system 12. In a broad sense the memory 22 comprises a used partition (or used partitions) and an unused partition. The used or core partition is an area of the memory 22 that is used to store data and the unused partition is an unused or empty area of the memory 22. The used partition may be partitioned further such that it comprises read-only system partitions and read/write user data partitions. The read/write user data partitions contain data indicative of the user of the vehicle 10 and the read-only system partitions contain data used by the main vehicle system software.

The unused partition of the memory 22 is an area of the memory 22 that is not being used to store any data. This is beneficial as the unused area of the memory 22 allows the memory 22 to be re-partitioned so as to increase the storage capacity of the used partition. For example, the controller 20 may receive a software update package 16 from the remote server 14 that requires the memory 22 to be repartitioned to install a new application. In this case the new application may be installed in the unused partition such that the used partition is not altered thereby preventing data being overwritten or corrupt.

The software update package 16 comprises data files or software applications for updating the memory 22, partition distribution data and partition validation data. The data files contained within the software update package 16 may be a software update that should be installed on the memory 22 to update or upgrade the existing software running on the memory 22. The partition distribution data within the software update package 16 is indicative of the new partition distribution or partition table that should be flashed to the memory 22 to re-partition the memory as part of the software update. The partition distribution data may comprise a memory partition update for re-partitioning the memory 22. For example, the new partition distribution data may be a new partition binary of the new partition table or the new partition distribution data may be a hash, such as a sha256 hash, of the new partition table.

The software update package 16 further comprises partition validation data. The partition validation data may be indicative of an allowable partition distribution, for example an expected partition distribution or previous partition distribution of the memory 22. The controller 20 may beneficially use the partition validation data received in the software update package 16 to determine if the memory 22 should be re-partitioned with the partition distribution data received in the software update package 16. The partition validation data contained within the software update package 16 beneficially allows the vehicle control system 12 to determine if it is safe to re-partition the memory 22 as part of the software update procedure. The partition validation data may be, for example, an allowable partition table, a list, such as a whitelist, of allowable partition tables or a hash of one or more allowable partition tables.

Figure 3:
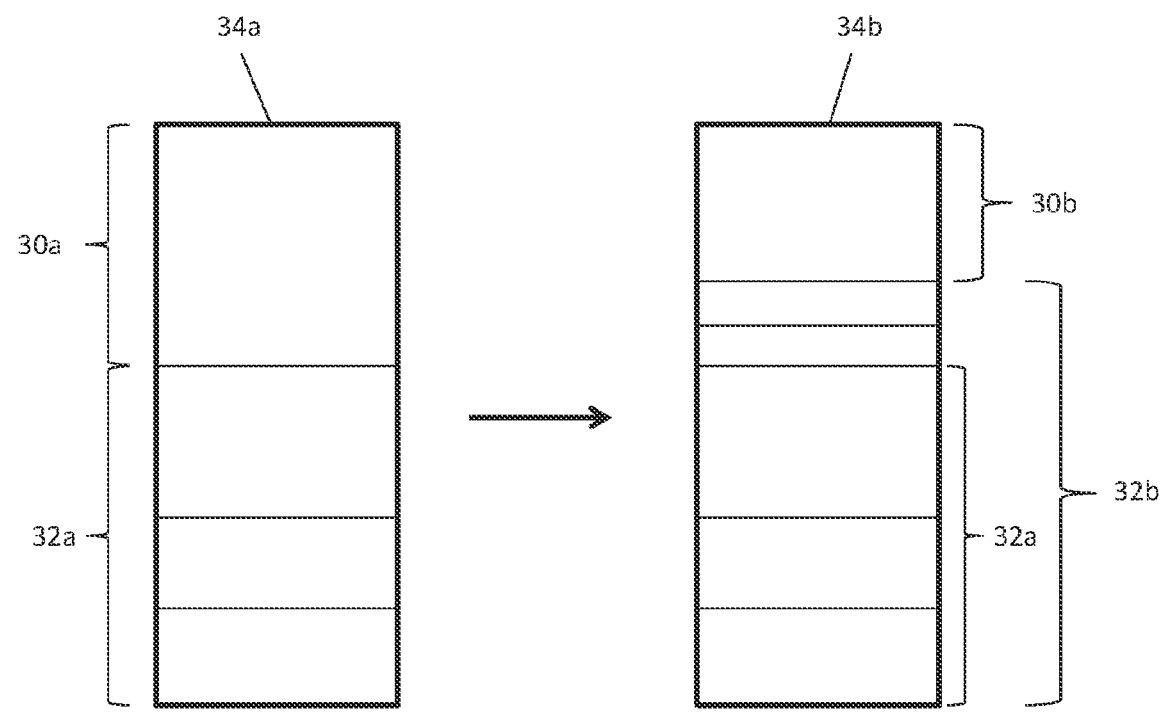
FIG. 3 shows a schematic view of a partition table of a partitioned memory before and after being re-partitioned in response to receiving the software update package.

FIG. 3 shows a schematic view of Globally Unique Identifier, GUID, partition tables 34*a*, 34*b* of the memory 22 before and after being repartitioned in response to receiving a software update package 16. The partition table 34*a* shows a partition distribution of the memory 22 prior to installation of the software update package and comprises a used partition 32*a* and an unused partition 30*a*. The used partition 32*a* is partitioned further into separate partitions for use by various applications and systems of the vehicle 10. The partition table 34*b* shows a partition distribution of the memory 22 after repartitioning the memory 22 in response to receiving a software update.

As shown in FIG. 3, the used partition 32*a* remains unchanged between partition table 34*a*, prior to the update and partition table 34*b*, after installation of the software update. This is beneficial as it ensures that data stored in the used partition 32*a* is not overwritten or corrupt when the memory 22 is re-partitioned. The new partition distribution table 34*b* comprises additional partitions within the used partition 32*b* that were added to a portion of the previously unused partition 32*a* such that no data was overwritten or corrupt as a result of the re-partitioning in the update.

It is undesirable to repartition the used partition 32*a* of the memory 22 during a software update as doing so may overwrite and corrupt the data stored within the used partition 32*a*. As such, care should be taken when re-partitioning the memory 22 in response to a software update package 16 so as not to overwrite data within the used partition 32*a*. To prevent the used partition 32*a* being overwritten or altered when re-partitioning the memory 22 in response to a software update the controller 20 is configured to determine if the new partition distribution or table contained within the partition distribution data of software update package 16 is allowable for the memory 22. To determine this, the controller 20 is configured to determine if re-partitioning the memory 22 with the new partition distribution data will overwrite or corrupt data stored within the used partition.

Upon receipt of the software update package 16 the controller 20 extracts the current partition distribution data from the memory 22. For example, the controller 20 may extract the partition table 34*a* from the memory 22 or data indicative of the partition table 34*a* such as a partition binary or partition hash of the table 34*a*. The current partition distribution data is then compared with the received partition validation data. If the current partition distribution data matches at least part of the received partition validation data then it may be inferred that it is safe to re-partition the memory 22 with the partition distribution data contained in the software update package 16. The comparison between the extracted or determined current partition distribution data and the partition validation data allows the controller 20 to determine if the used partition 32*a* of the current partition table 34*a* matches at least a portion of the used partition 32*b* in the received partition table 34*b*.

If the partition distribution data of the extracted partition table 34*a* matches the partition validation data the controller 20 will proceed with the software update and the current partition table 34*a* of the memory is re-partitioned with the new partition table 34*b*. However, if the partition distribution data of the extracted partition table 34*a* does not match the partition validation data then the update is aborted and marked as failed. If the extracted partition table does not match the partition validation data then the used partition 32*a* does not match the used partition 32*b* in the new partition distribution and thus re-flashing the memory 22 with the new partition distribution data may cause the memory 22 to be overwritten or corrupt. The result of the software update may be transmitted back to the remote server 14 by the vehicle control system 12.

Figure 4:
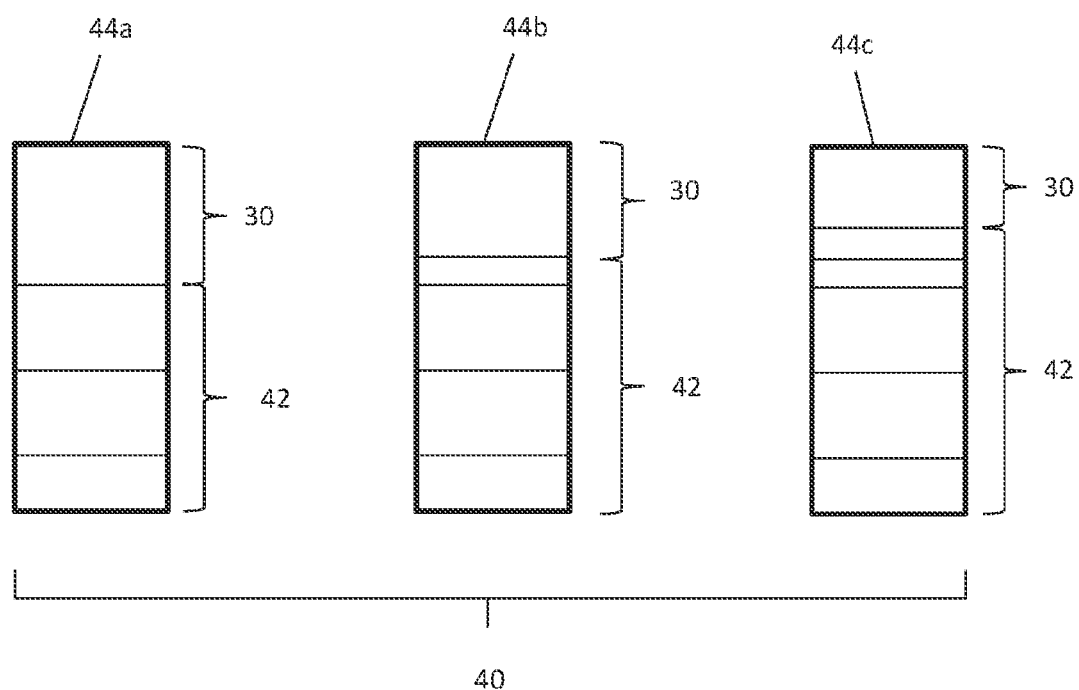
FIG. 4 shows a schematic view of allowable partition distributions forming a whitelist.

FIG. 4 shows a schematic view of partition tables forming the partition validation data contained within the software update package 16. The partition tables 44*a*, 44*b*, 44*c* shown in FIG. 4 may form a whitelist 40 of allowable partition tables that can support the partition distribution data contained within the software update package 16. The partition tables 44*a*, 44*b*, 44*c* are representative of old or previous partition distributions of the memory 22. The used partition 42 of each partition table 44 on the whitelist 40 has at least a common core structure that may be compared with the partition table extracted from the memory 22.

The whitelist 40 may be a list of partition hashes of each partition table 44*a*, 44*b*, 44*c* on the whitelist 40. The partition hash is a unique identifier or value representative of each partition table 44*a*, 44*b*, 44*c* contained within the whitelist 40. The controller 20 may determine the hash value of the partition table 34*a* of the memory 22 and compare it with the list of hash values contained within the whitelist 40. If the hash value of the partition table 34*a* of the memory 22 matches a hash value on the whitelist 40 of the partition validation data then the controller 20 will determine that it is safe to proceed with the software update and re-partition the memory 22 with the new partition table 34*b*.

Figure 5:
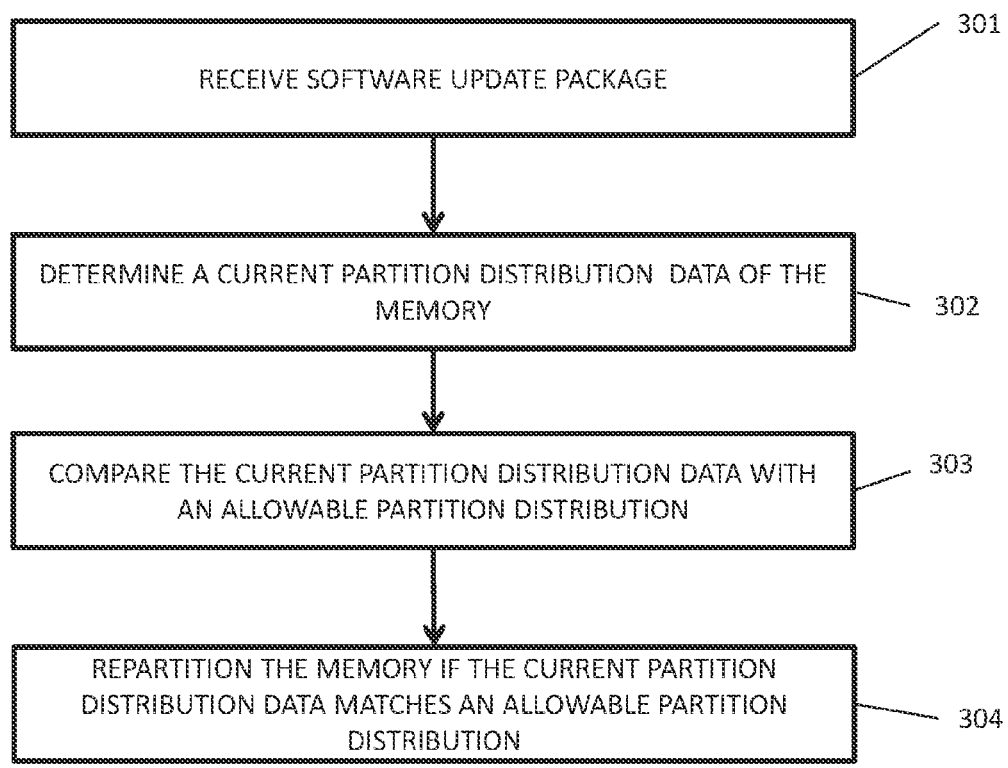
FIG. 5 shows a flow chart outlining the method steps of updating the vehicle control system according to an embodiment of the invention.

FIG. 5 shows a flow chart outlining a method of updating the vehicle control system 12. In step 301 the controller 20 receives a software update package 16 from the remote server 14. The software update package 16 comprises data files or software applications, partition distribution data for the memory 22 and partition validation data. The partition distribution data may be data indicative of a new partition table for the memory 22. For example, the partition distribution data may be a partition binary or a hash of the new partition table. The skilled reader will appreciate that the term partition distribution data describes the position of the partitions within the partition table and may be data indicative of the new partition table.

In step 302 the controller 20 is configured to determine current partition distribution data, for example the current partition table 34a, of the memory 22. The controller 20 may extract the current partition distribution or current partition table from the memory 22 so as to determine how the memory 22 is partitioned prior to the software update. The controller 20 may generate a hash value of the extracted partition distribution.

In step 303 the controller 20 is configured to compare the determined current partition distribution data with the partition validation data received in the software update package 16. The partition validation data may be, for example, a whitelist of allowable partition distributions of the memory 22 or it may be an expected current partition distribution of the memory 22. Comparing the current partition distribution data and the partition validation data may comprise checking if the current partition distribution data matches an allowable partition distribution. For example, the controller may compare hash values of the current partition distribution data and the partition validation data to check if the hash values match.

In step 304, if the determined current partition distribution data matches the partition validation data then the memory 22 is re-partitioned with the new partition table indicative of the new partition distribution data. However, if the current partition distribution data does not match the partition validation data then the software update is aborted and the memory 22 is not re-partitioned.

The method may further comprise comparing the received partition distribution data with the extracted partition distribution data. If the received partition distribution data matches the extracted or determined partition distribution data of the memory 22 then there is no requirement to re-partition the memory 22 and thus the memory 22 will not be re-partitioned based on the received software update. However, if the received partition distribution data does not match the extracted partition distribution data the controller 20 will proceed with comparing the extracted partition distribution data with the partition validation data as outlined above.

Figure 6:
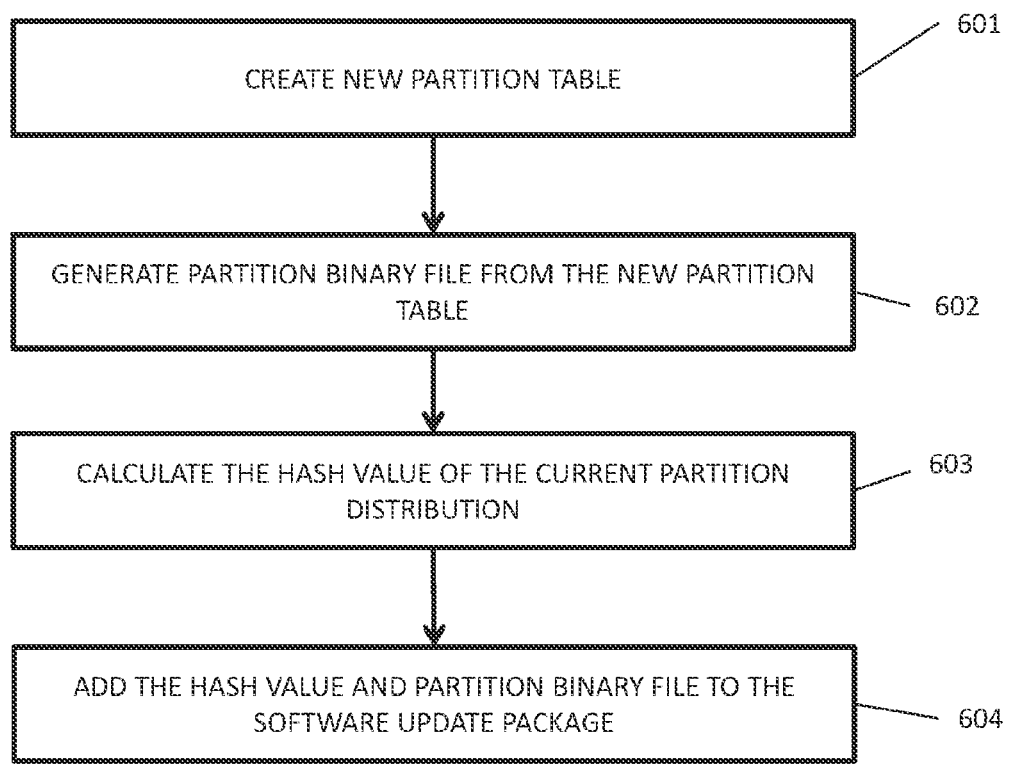
FIG. 6 shows a flow chart outlining the method steps of building the software update package on the remote server.

FIG. 6 shows a flow chart outlining a method of building the software update package 16 on the remote server 14. In step 601 the new partition table 34b for the memory 22 is created in a build server. Next, in step 602, the partition binary file is extracted from the new partition table 34b. The skilled reader will understand that the partition binary file may be generated directly in the build server. The hash of the new partition table 34b may also be calculated.

In step 603 the hash of the current partition distribution table 32a is calculated. Furthermore, the hash of previous versions of the partition distribution table on the memory may be determined and a whitelist of allowable partition distributions may be generated. The hash of the current partition distribution table 32a and/or the whitelist of allowable partition distributions may form the partition validation data.

Finally, in step 604 the hash of the current partition distribution table 32a or partition validation data and the new partition distribution table 32b or partition distribution data is added to the software update package 16 and transmitted to the vehicle 10.

The skilled reader will understand that whilst the aforementioned embodiments have been described in the context of receiving a software update package 16 wirelessly from a remote server 14 the software update package 16 may be delivered to the vehicle 10 via alternative means. For example, the software update package 16 may be loaded on a portable storage device which may be connected to the vehicle 10 such that the vehicle control system 12 may receive the software update package 16 from the portable storage device. Alternatively, the software update package 16 may be transmitted to a mobile communication device, such as a mobile phone. The mobile communication device may then transmit the software update package 16 to the vehicle 10 via, for example, Bluetooth® communication.

Figure 7:
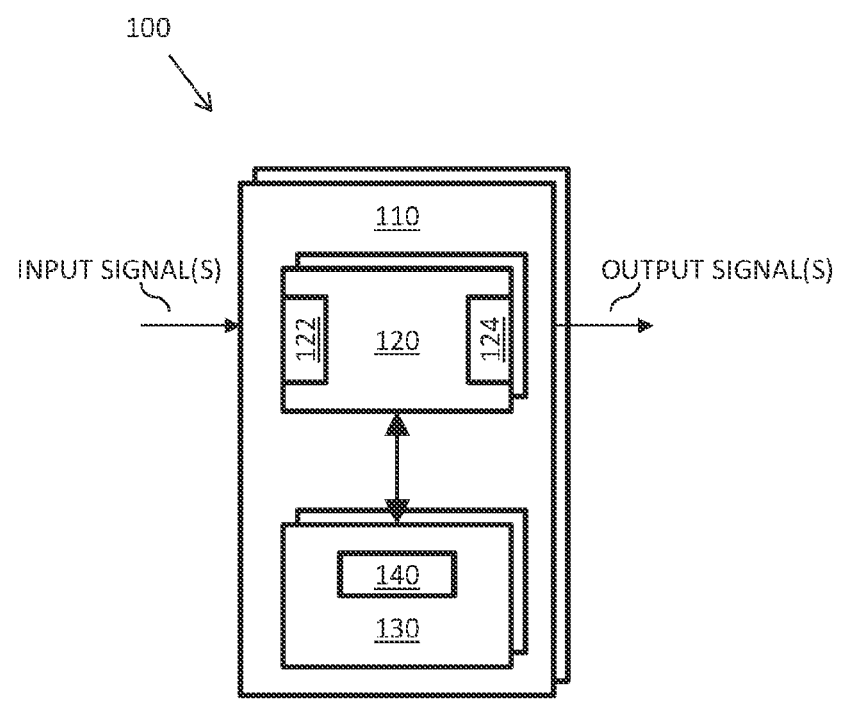
FIG. 7 shows a simplified example of a control system suitable for use with embodiments of the invention.

With reference to FIG. 7, there is illustrated a simplified example of a control system 100 such as may be adapted to implement the method of FIG. 5 described above. The control system 100 comprises one or more controllers 110 and is configured to receive a software update package, the software update package comprising partition validation data and partition distribution data; determine a current partition distribution data of the memory; compare the current partition distribution data with the partition validation data; and repartition the memory in dependence on the received partition distribution data if the current partition distribution data matches the partition validation data.

It is to be understood that the or each controller 110 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 110 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 110 to implement the control techniques described herein (including some or all of the functionality required for the method described herein). The set of instructions could be embedded in said one or more electronic processors of the controller 110; or alternatively, the set of instructions could be provided as software to be executed in the controller 110. A first controller or control unit may be implemented in software run on one or more processors. One or more other controllers or control units may be implemented in software run on one or more processors, optionally the same one or more processors as the first controller or control unit. Other arrangements are also useful.

In the example illustrated in FIG. 7, the or each controller 110 comprises at least one electronic processor 120 having one or more electrical input(s) 122 for receiving one or more (input signal(s)), and one or more electrical output(s) 124 for outputting one or more (output signal(s)). The or each controller 110 further comprises at least one memory device 130 electrically coupled to the at least one electronic processor 120 and having instructions 140 stored therein. The at least one electronic processor 120 is configured to access the at least one memory device 130 and execute the instructions 140 thereon so as to repartition the partitioned memory if the current partition distribution data matches the partition validation data.

The, or each, electronic processor 120 may comprise any suitable electronic processor (e.g., a microprocessor, a microcontroller, an ASIC, etc.) that is configured to execute electronic instructions. The, or each, electronic memory device 130 may comprise any suitable memory device and may store a variety of data, information, threshold value(s), lookup tables or other data structures, and/or instructions therein or thereon. In an embodiment, the memory device 130 has information and instructions for software, firmware, programs, algorithms, scripts, applications, etc. stored therein or thereon that may govern all or part of the methodology described herein. The processor, or each, electronic processor 120 may access the memory device 130 and execute and/or use that or those instructions and information to carry out or perform some or all of the functionality and methodology describe herein.

The at least one memory device 130 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 110 have been described comprising at least one electronic processor 120 configured to execute electronic instructions stored within at least one memory device 130, which when executed causes the electronic processor(s) 120 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application.

The invention claimed is:

1. A control system for a vehicle, the control system comprising at least one controller configured to access at least one partitioned memory, the control system configured to:
    receive a software update package, the software update package comprising at least one data file of a software update, partition validation data representing at least one value of at least one valid data partition and new partition distribution data;
    determine a current partition distribution data of the at least one partitioned memory;
    validate the current partition distribution data with the partition validation data by:
        generating a partition distribution value representative of a core partition distribution structure of the at least one partitioned memory from the determined current partition distribution data, wherein the core partition distribution structure represents an area of the memory that is already in use; and
        comparing the generated partition distribution value with the partition validation data;
    in response to the current partition distribution data matching the partition validation data, repartition the at least one partitioned memory in dependence on the new partition distribution data; and
    perform the software update in the repartitioned memory.

2. The control system of claim 1, wherein the at least one controller comprises:
    at least one electronic processor having an electrical input for receiving the software update package; and
    at least one memory device electrically coupled to the at least one electronic processor and having instructions stored therein; and
    wherein the at least one electronic processor is configured to access the at least one memory device and execute the instructions thereon so as to repartition the at least one partitioned memory if the current partition distribution data matches the partition validation data.

3. The control system as claimed in claim 1, wherein the new partition distribution data comprises a memory partition update and wherein the at least one partitioned memory is repartitioned according to the memory partition update.

4. The control system as claimed in claim 3, wherein the partition validation data is representative of at least a part of a partition structure of the memory partition update.

5. The control system as claimed in claim 1, wherein determining the current partition distribution data comprises generating a partition distribution value, optionally a partition hash value, representative of at least a part of a partition distribution structure of the at least one partitioned memory.

6. The control system as claimed in claim 5, wherein the partition distribution value is representative of a core partition distribution structure.

7. The control system as claimed in claim 1, wherein the at least one controller is configured to inhibit a software update associated with the software update package if the current partition distribution data does not match the partition validation data.

8. The control system as claimed in claim 1, wherein the at least one controller is configured to abort repartitioning the at least one partitioned memory if the new partition distribution data matches the current partition distribution data.

9. The control system as claimed in claim 1, wherein the partition validation data comprises a whitelist of allowable partition distributions.

10. The control system as claimed in claim 9, wherein the allowable partition distributions are representative of old partition distributions of the at least one partitioned memory.

11. The control system as claimed in claim 9, wherein the allowable partition distributions comprise an allowable partition hash of the allowable partition distributions.

12. The control system as claimed in claim 1, wherein the at least one partitioned memory comprises an unused partition area and wherein repartitioning the at least one partitioned memory comprises repartitioning at least a portion of the unused partition area.

13. The control system as claimed in claim 1, wherein the software update package comprises a current partition distribution.

14. The control system as claimed in claim 13, wherein the control system is configured to compare the current partition distribution received in the software update package with the current partition distribution determined by control system.

15. The control system as claimed in claim 14, wherein at least one electronic processor is configured to inhibit a software update associated with the software update package if the compared current partition distributions do not match.

16. The control system as claimed in claim 1, wherein at least one of: the current partition distribution data, the partition validation data and the new partition distribution data is a partition hash.

17. The control system as claimed in claim 1, wherein the new partition distribution data comprises a new partition table or a new partition binary.

18. The control system as claimed in claim 1 comprised in a vehicle.

19. A method of repartitioning a controller for a vehicle, the controller comprising at least one partitioned memory, the method comprising:
  receiving a software update package, the software update package comprising at least one data file of a software update partition validation data representing at least one value of at least one valid data partition and new partition distribution data;
  determining a current partition distribution data of the at least one partitioned memory;
  validating the current partition distribution data with the partition validation data by:
    generating a partition distribution value representative of a core partition distribution structure of the at least one partitioned memory from the determine current partition distribution data, wherein the core partition distribution structure represents an area of the memory that is already in use; and
    comparing the generated partition distribution value with the partition validation data;
  in response to the current partition distribution data matching the partition validation data, repartitioning the at least one partitioned memory in dependence on the new partition distribution data; and
  performing the software update in the repartitioned memory.

20. A non-transitory, computer readable medium storing instructions thereon that, when executed by one or more electronic processors, causes the one or more electronic processors to carry out the method of claim 19.

* * * * *